Nov. 1, 1960 K. G. KING 2,958,529

ATTACHMENT FOR PHONOGRAPHS

Filed May 21, 1958 2 Sheets-Sheet 1

INVENTOR.
KARL G. KING
BY
Salvatore G. Militana
ATTORNEY

Nov. 1, 1960 K. G. KING 2,958,529

ATTACHMENT FOR PHONOGRAPHS

Filed May 21, 1958 2 Sheets-Sheet 2

INVENTOR.
KARL G. KING
BY
Salvatore G. Militana
ATTORNEY

United States Patent Office 2,958,529

Patented Nov. 1, 1960

2,958,529

ATTACHMENT FOR PHONOGRAPHS

Karl G. King, 1015 Ibis Ave., Miami Springs, Fla.

Filed May 21, 1958, Ser. No. 736,752

5 Claims. (Cl. 274—47)

This invention relates to attachments for phonographs and is more particularly directed to an attachment which is removably mounted on the pickup arm of a phonograph.

A principal object of the present invention is to provide an attachment for a phonograph pick up arm which cleans a record by removing grit and dust from the grooves as well as the top surface of the record and eliminates static electricity created by the needle rubbing along the record.

Another object of the present invention is to provide an attachment for a phonograph which is readily attachable to the pickup arm and which permits swinging the arm to any position on the record without danger of scratching the record.

A further object of the present invention is to provide an attachment for a phonograph pickup arm which functions as described above and is simple to attach to and remove from the pick up arm, is simple in construction and inexpensive in cost.

A still further object of the present invention is to provide an attachment for phonograph pickup arms with a brush formed of a plastic sponge impregnated with a chemical for cleaning a record, the sponge being positioned ahead of the needle and straddling same across the record, so that the record is being cleaned before the needle reaches that portion of the record and static electricity imparted to the record by the needle is likewise eliminated by the sponge rubbing thereon.

A still further object of the present invention is to provide an attachment for a phonograph pick up arm consisting of a substantially balanced arm pivoted thereon and a hooded brush or sponge mounted on the free end of the arm, the traction between the sponge and the record being constant at all times and determined by the weight of the hooded brush unaffected by the arm on which it is mounted.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
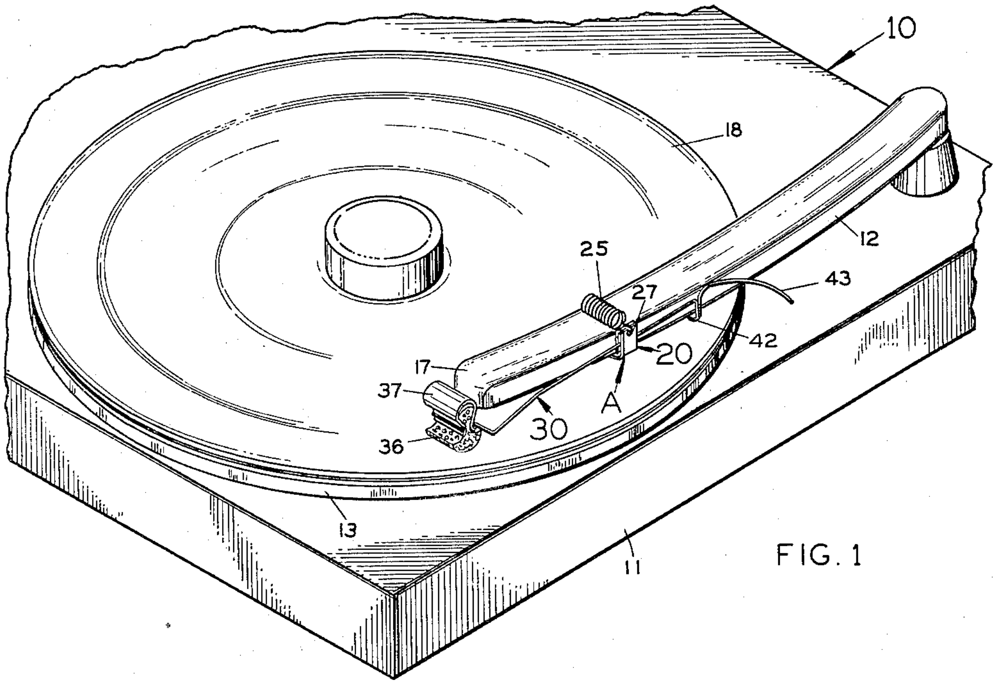
Figure 1 is a fragmentary perspective view of a conventional turn table and pick up arm of a high fidelity phonograph showing my attachment in position thereon.
Figure 2:
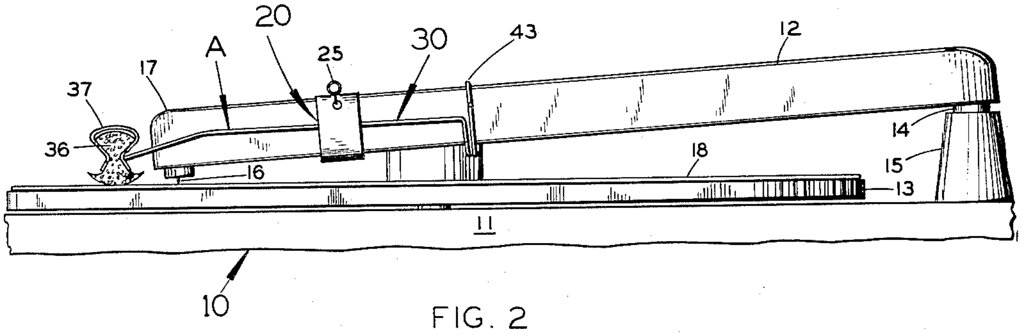
Figure 2 is a side elevational view thereof showing the relative position of the various parts of my attachment when used to remove dirt from a record.
Figure 3:
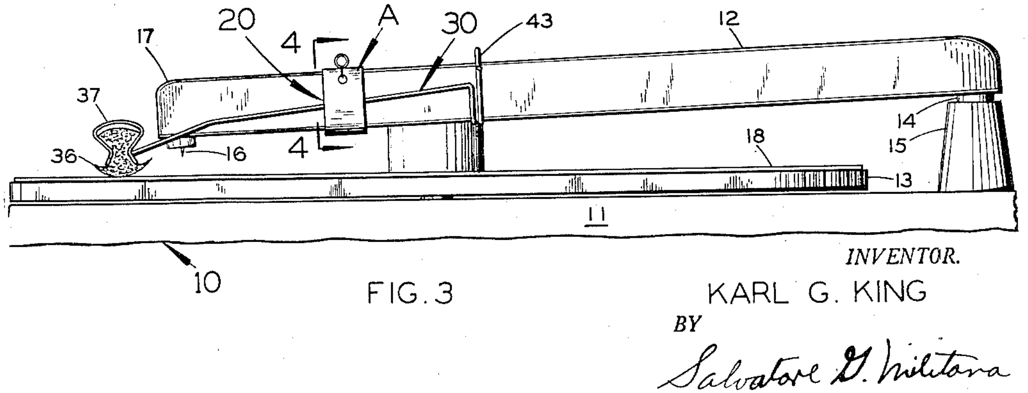
Figure 3 is a similar view showing my attachment when used to shift the needle to a new position on the record.
Figure 6:
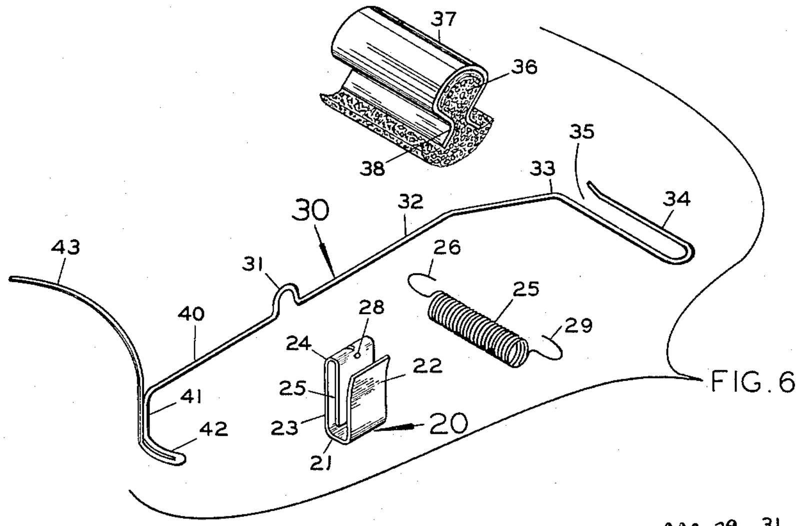
Figure 6 is an exploded view of my attachment.

Referring to the drawings wherein like numerals are used to designate similar parts throughout the several views, the numeral 10 refers to a conventional turntable shown only in part of a phonograph consisting of a stationary table 11 upon which are mounted a pick up arm 12 and a rotatable record supporting disc 13. The pick up arm 12 is pivotally secured at one end as at 14 to a support 15 secured to the table 11 and is provided at its other end with a record engaging needle 16. Being of conventional construction, the pick-up arm is U-shaped in cross section (see Figure 4) having a base portion along whose edges extend depending flanges 19. A phonograph record 18 is shown positioned on the disc 13 for playing.

Removably mounted at the free end 17 of the pick-up arm 12 is an attachment A which is the subject matter of this application, comprising a resilient support bracket 20 constructed so as to slip on one of the depending flanges 19 of the pick-up arm 12. The bracket 20 is produced from a short length of sheet metal of proper resiliency bent as at 21 to form upwardly extending flanges 22 and 23 and bent downwardly as at 24 to form a downwardly extending flange 25 interposed between the flanges 22 and 23 and in spaced relation thereto. The flanges 22 and 25 resiliently engage the depending flange 19 to mount the bracket 20 to the arm 12. The bracket 20 is secured thereon by a coil spring 25 having a clip or hook 26 at one end extending through bores 27 and 28 in the flanges 23 and 25 respectively and at the other end clip or hook 29 engaging the inside surface of the flange 19, the coil spring 25 being in a stretched condition lying on the base portion 12 and flange 19.

That portion of the hook or clip 26 which extends through the bores 27 and 28 between the flanges 23 and 25 of the bracket 20 acts as a pivot pin for a lift arm 30 which lies longitudinally of the pick-up arm 12 extending beyond the free end 17 of the arm 12 at one end.

The lift arm 30 is constructed preferably of a wire of proper tensile characteristic, though any material such as plastic and the like may be used as in the production of the support bracket 20. The lift arm 30 is bent upwardly and then downwardly to form an arch 31 having a recess for receiving the pivot pin 26 upon which the lift arm 30 pivots as is explained in greater detail hereinafter. The lift arm 30 extends forwardly as at 32 a short distance, then bent slightly downwardly so as to extend downwardly at a more acute angle for a relatively short distance where the wire is bent as at 33 so as to extend substantially horizontally at right angle thereto and returned on itself to form an elongated clip 34 having an elongated recess 35. The clip 34 is adapted to removably mount a plastic sponge 36 and hood 37 therefor. The hood 37 is shaped as shown and crimped together as at 38, for securing the sponge 36 in position therein and also for providing a track for the arms of the clip 34 when the hood 37 is slipped into position on the clip 34.

The lift arm 30 extends rearwardly from the pivot arch 31 as along 40 in substantial alignment with the portion 32 of the lift arm 30 and then bent so as to extend downwardly as at 41 to a position adjacent the lower end of the flange 19 where the wire is bent horizontally to form a shoulder portion 42 for engaging the lower edge of the flange 19. The wire at 42 is bent and returned on itself along the vertical portion 41 to the horizontal portion 40 where a handle 43 is formed extending in a direction away from the portion 40 of the lift arm 30.

The record cleaning device 36 is preferably made of plastic or foam rubber to form a sponge which is impregnated with certain chemicals to enhance the cleaning qualities of the sponge 36. The plastic or foam rubber sponge 36 will not scratch the record when the latter is drawn over the revolving record. Also, it is known that the friction effected by the revolving record and the stationary needle creates static electricity which is imparted to the dirt on the record and therefore makes the dust and grime adhere more firmly to the record. The plastic sponge 36 eliminates this static electricity when the sponge 36 rubs on the record by neutralizing the static electricity at the moment it is created at the position of the needle 16. The sponge 36 resting on the record it is cleaning will take the shape of the grooves and ridges of the record at its lower surface, and thereby clean the entire surface of the record of the grit and dust thereon.

Figure 4:
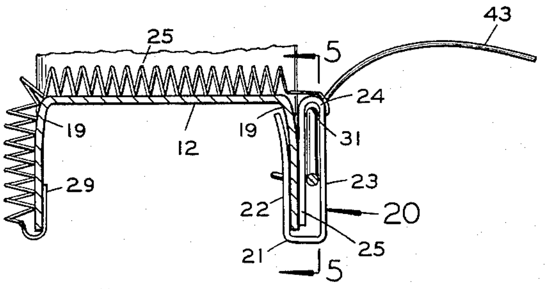
Figure 4 is a cross sectional view taken along the line 4—4 of Figure 3.
Figure 7:
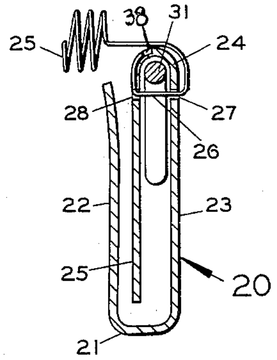
Figure 7 is a cross sectional view taken along the line 7—7 of Figure 5.
Figure 5:
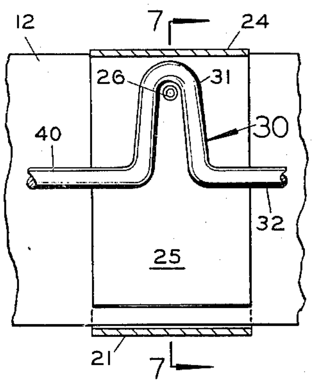
Figure 5 is a cross sectional view taken along the line 5—5 of Figure 4.
Figure 8:
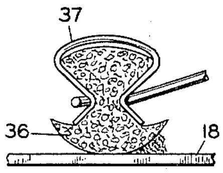
Figures 8 and 9 are diagrammatic views of the action of the sponge when sliding along the grooves of a record in cleaning and when sliding transversely of the grooves when moving the needle to different positions on the record.
Figure 9:
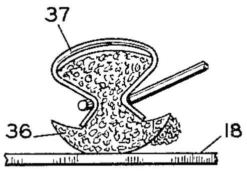

The attachment A is readily mounted on the pick-up arm 12 of a phonograph by bracketing the outer depending flange 19 of the pick-up arm 12 with flanges 22 and 25 of the bracket 20 on either side thereof and pushing upwardly on the bracket 20 until the flange 19 becomes seated as shown best by Figure 4. The coil spring 25 is then stretched and the clip or hook end 29 of the spring 25 is slipped over the lower edge of the inner depending flange 19 of the arm 12. The bracket 20 is now securely mounted on the pick-up arm 12. With the bracket 20 thusly mounted, the sponge 36 will be forward of the arm 12 in close proximity to the needle 16 and the handle 43 will be positioned alongside the arm 12 intermediate the ends thereof. Also, the shoulder 42 will extend inwardly slightly below the lower edge of the flange 19 of the arm 12. When a record is being played on the phonograph, the sponge 36 will rest on the record 18 cleaning the record of the dirt and grime in advance of the needle 16. When it is decided to move the needle to another position on the record as in long playing records, for example, a person will grasp the handle 43 and lift upwardly causing the arm 30 to pivot about the pivot pin 26 and the shoulder 42 engages the flange 19 of the arm 12. Since the sponge 36 is resting on the record 18, the arm 30 will first pivot slightly about the sponge 36 as a fulcrum then the upward movement of the shoulder 42 will lift the bracket 20 and the pick-up arm 12 since the bracket 20 is secured thereto. The needle 16 will then be lifted vertically off the record. With the sponge 36 resting on the record, a sidewise force is exerted on the handle 43 in the direction on the record the person wishes to move the needle. The sponge 36 moves readily on the record, cleaning it as it moves therealong without scratching or impairing the record. Having arrived at the desired position on the record, the upward force on the handle 43 is released to permit the pick-up arm 12 to swing downwardly in a vertical plane until the needle comes to rest in the desired groove on the record. At no time is there any transverse movement of the needle 16 while in contact with the record. Since the arm 30 is pivoted at approximately the midportion thereof then there will be none of its weight carried by the combination sponge 36 and hood 37 regardless what position the attachment takes when placed on the arm 12. Therefore, the desired traction as calibrated and rendered to the sponge 36 by the weight of the hood 37 cannot be changed or affected even if placed improperly on the pick-up arm 12.

It is to be noted that the sponge 36 is sufficiently wide as to extend across a number of grooves on the record and is positioned in front of the needle so that as the record revolves the sponge cleans a number of grooves ahead of the needle position and a number of grooves already engaged by the needle in order to eliminate the static electricity effected by the rubbing of the needle along the groove in the record.

Having described my invention, what I claim as new is:

1. An attachment for a pick-up arm of a phonograph comprising mounting means for securing said attachment to the pick-up arm, an elongated arm member, pivot means mounting said elongated arm member intermediate its ends on said mounting means, brush holding means mounted at one end of said elongated arm member, a handle mounted at the other end of said elongated member and shoulder means mounted on said elongated member below said pick-up arm in proximity of said handle for engaging and lifting said pick-up arm upon the upward pivotal movement of said elongated arm member.

2. An attachment for a pick-up arm of a phonograph comprising a resilient clip for mounting said attachment to said pick-up arm, said clip having a pair of spaced apart side walls, an elongated arm member, means pivotally mounting said elongated arm member intermediate its ends on said clip, a brush holding device mounted on one end of said elongated arm, a handle mounted at the other end of said elongated arm member, and pick-up arm engaging shoulder means mounted on said elongated arm member adjacent said handle whereby upon the swinging of said elongated arm member on said clip by said handle said shoulder engages said pick-up arm and lifts said pick-up arm.

3. The structure as recited by claim 2 wherein said brush holding device comprises a portion of said elongated arm member bent and returned upon itself in spaced relation to form a recess for receiving a record cleaning brush.

4. In a phonograph having a pick-up arm and a needle mounted at one end of said pick-up arm, an attachment comprising a resilient clip mounted on one side of said pick-up arm, said clip having spaced apart side walls and a bore extending through said side walls, a transversely extending coil spring having end portions, one end portion extending through said bores and the other end portion engaging the other side of said pick-up arm, an elongated arm member extending longitudinally and in spaced relation to said side wall of said pick-up arm, means pivotally mounting said elongated arm member between said side walls of said clip on said coil spring end portion, a brush holding device mounted at one end of said elongated arm member beyond said pick-up arm and in substantial alignment thereto, a brush removably mounted on said brush holding device, a handle mounted at the other end of said elongated arm member adjacent said pick-up arm and shoulder means mounted on said elongated arm member below said pick-up arm and adjacent said handle for engaging said pick-up arm upon a vertical swinging movement of said handle and said elongated arm.

5. The structure as recited by claim 4 wherein said brush comprises a rectangular block of sponge material and a hood for said sponge material, said hood being substantially U-shaped in cross section with leg portions crimped in a direction toward each other for gripping side portions of said sponge material.

References Cited in the file of this patent

UNITED STATES PATENTS

| | | |
|---|---|---|
| 1,249,720 | Christian | Dec. 11, 1917 |
| 1,435,645 | Kidder | Nov. 14, 1922 |
| 2,006,322 | Horton | June 25, 1935 |
| 2,306,946 | Horton et al. | Dec. 29, 1942 |
| 2,340,435 | Spinelli | Feb. 1, 1944 |
| 2,496,861 | De Boer et al. | Feb. 7, 1950 |
| 2,522,384 | Lapir | Sept. 12, 1950 |
| 2,670,213 | Zimmerman | Feb. 23, 1954 |
| 2,773,692 | Dunnavan | Dec. 11, 1956 |
| 2,914,329 | Schell | Nov. 24, 1959 |